US010203669B2

(12) United States Patent
Jun (10) Patent No.: US 10,203,669 B2
(45) Date of Patent: Feb. 12, 2019

(54) CONTROLLING ELECTRONIC DEVICES BASED ON FOOTSTEP PATTERN

(71) Applicant: KT CORPORATION, Gyeonggi-do (KR)

(72) Inventor: Hyun-Su Jun, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 463 days.

(21) Appl. No.: 14/481,878

(22) Filed: Sep. 9, 2014

(65) Prior Publication Data

US 2015/0073568 A1      Mar. 12, 2015

(30) Foreign Application Priority Data

Sep. 10, 2013   (KR) .................... 10-2013-0108461

(51) Int. Cl.
*G05B 15/02*    (2006.01)
*H04L 12/28*    (2006.01)

(52) U.S. Cl.
CPC .......... *G05B 15/02* (2013.01); *H04L 12/2825* (2013.01); *H04L 12/2827* (2013.01); *G05B 2219/2642* (2013.01)

(58) Field of Classification Search
CPC ............ H04L 12/2827; H04L 12/2825; G05B 2219/2642; G05B 15/02
USPC ............................ 700/19; 702/150; 345/173
See application file for complete search history.

(56) References Cited

U.S. PATENT DOCUMENTS

| 4,780,706 | A | * | 10/1988 | Bollag .................... A01K 1/035 340/573.3 |
| 5,579,221 | A | * | 11/1996 | Mun .................... G05B 19/042 340/12.54 |
| 5,621,662 | A | * | 4/1997 | Humphries ............ G05B 15/02 340/3.1 |
| 5,946,209 | A | * | 8/1999 | Eckel .................... H01H 47/007 315/159 |
| 6,205,233 | B1 | * | 3/2001 | Morley ............. G06K 9/00335 382/103 |
| 6,728,351 | B2 | | 4/2004 | Ahlstrom et al. |
| 6,792,319 | B1 | * | 9/2004 | Bilger .................... G05B 15/02 700/12 |
| 6,909,921 | B1 | * | 6/2005 | Bilger .................... G05B 15/02 700/14 |
| 7,093,693 | B1 | | 8/2006 | Gazdzinski |
| 7,366,498 | B2 | | 4/2008 | Ko et al. |
| 7,398,860 | B2 | | 7/2008 | Amano |

(Continued)

FOREIGN PATENT DOCUMENTS

| EP | 2463798 A1 * | 6/2012 | ............. G06F 3/041 |
| EP | 2733636 A1 * | 5/2014 | ............. G06F 21/32 |

(Continued)

*Primary Examiner* — Kenneth M Lo
*Assistant Examiner* — Mohammed Shafayet
(74) *Attorney, Agent, or Firm* — IP Legal Services, LLC (57) ABSTRACT

The disclosure is related to controlling electronic devices in a target control area based on a footstep pattern of a registered member. Such controlling may be performed through identifying a person detected by a sensor based on footstep information received from the sensor, obtaining control information associated with the identified registered member, and controlling target devices in the target control area based on the obtained control information.

20 Claims, 6 Drawing Sheets

(56) References Cited

U.S. PATENT DOCUMENTS

| | | | |
|---|---|---|---|
| 7,461,723 B2 | 12/2008 | Kawai | |
| 7,774,527 B2* | 8/2010 | Kim | G08C 17/00 710/106 |
| 8,020,672 B2* | 9/2011 | Lin | B66B 1/34 187/316 |
| 8,061,485 B2 | 11/2011 | Finschi | |
| 8,138,882 B2* | 3/2012 | Do | G08B 21/043 340/5.1 |
| 8,401,781 B2* | 3/2013 | Pazos | G01C 21/005 340/10.1 |
| 8,413,767 B2 | 4/2013 | Nakashima | |
| 8,436,828 B1* | 5/2013 | Zhai | G06F 3/0488 345/173 |
| 8,467,911 B2* | 6/2013 | Luo | G05B 15/02 700/22 |
| 8,683,582 B2* | 3/2014 | Rogers | G06F 21/36 726/21 |
| 8,813,917 B2 | 8/2014 | Salmikuukka et al. | |
| 8,857,569 B2 | 10/2014 | Friedli | |
| 8,976,248 B2 | 3/2015 | Tanaka | |
| 8,988,191 B2* | 3/2015 | Zhang | G06F 3/045 340/5.53 |
| 9,014,826 B2* | 4/2015 | Yum | H04L 12/2809 68/12.12 |
| 9,055,621 B2* | 6/2015 | Shrubsole | H05B 37/02 |
| 9,323,232 B2 | 4/2016 | Blom et al. | |
| 9,382,096 B2 | 7/2016 | Finschi | |
| 2005/0009498 A1* | 1/2005 | Ho | H04L 12/2803 455/402 |
| 2005/0151628 A1* | 7/2005 | Becker | B60R 25/04 340/426.1 |
| 2006/0005041 A1* | 1/2006 | Lazeroms | A61B 5/1036 713/186 |
| 2006/0158820 A1* | 7/2006 | Takiguchi | G07C 9/00087 361/231 |
| 2006/0262120 A1* | 11/2006 | Rosenberg | G06F 3/011 345/473 |
| 2007/0200658 A1* | 8/2007 | Yang | H04L 12/2803 340/3.7 |
| 2007/0263993 A1* | 11/2007 | Kobayashi | A47J 27/62 392/308 |
| 2008/0191864 A1* | 8/2008 | Wolfson | G06F 3/011 340/524 |
| 2009/0091529 A1* | 4/2009 | Do | G06F 3/0425 345/156 |
| 2009/0288545 A1* | 11/2009 | Mann | G09B 5/06 84/484 |
| 2010/0016125 A1* | 1/2010 | Bellandi | A63B 6/00 482/4 |
| 2010/0076347 A1* | 3/2010 | McGrath | A61B 5/1038 600/595 |
| 2010/0162182 A1* | 6/2010 | Oh | G06F 3/04883 715/863 |
| 2010/0194525 A1* | 8/2010 | Do | G08B 21/0461 340/5.1 |
| 2010/0225443 A1* | 9/2010 | Bayram | G06F 21/316 340/5.83 |
| 2010/0289643 A1* | 11/2010 | Trundle | F24F 11/0086 340/545.1 |
| 2011/0050394 A1* | 3/2011 | Zhang | G06F 3/045 340/5.82 |
| 2012/0086659 A1* | 4/2012 | Perlin | G06F 3/005 345/173 |
| 2012/0253233 A1* | 10/2012 | Greene | A61B 5/1117 600/592 |
| 2014/0081433 A1* | 3/2014 | Cheong | H04L 12/2809 700/90 |
| 2015/0018018 A1* | 1/2015 | Shen | H04W 4/04 455/457 |
| 2015/0039100 A1* | 2/2015 | Yoshida | G08C 17/00 700/19 |
| 2015/0039105 A1* | 2/2015 | Lee | H04L 12/2827 700/90 |
| 2015/0345065 A1* | 12/2015 | Yang | D06F 33/02 700/275 |

FOREIGN PATENT DOCUMENTS

| | | |
|---|---|---|
| JP | 2007-290811 A | 11/2007 |
| JP | 2009-208900 A | 9/2009 |
| JP | 2011-153002 A | 8/2011 |
| KR | 10-2005-0005869 A | 1/2005 |
| KR | 10-2006-0066980 A | 6/2006 |
| KR | 10-2006-0084165 A | 7/2006 |
| KR | 10-0606760 B1 | 7/2006 |
| KR | 10-2007-0074075 A | 7/2007 |
| KR | 10-2008-0086206 A | 9/2008 |
| KR | 10-0951716 B1 | 4/2010 |
| KR | 10-0999084 B1 | 12/2010 |
| KR | 10-2011-0042708 A | 4/2011 |
| KR | 10-2013-0067852 A | 6/2013 |
| WO | WO 2005050580 A2 * 6/2005 ............ G01V 1/001 |

* cited by examiner

CONTROLLING ELECTRONIC DEVICES BASED ON FOOTSTEP PATTERN

CROSS REFERENCE TO PRIOR APPLICATIONS

The present application claims priority under 35 U.S.C. § 119 to Korean Patent Application No. 10-2013-0108461 (filed on Sep. 10, 2013), which is hereby incorporated by reference in its entirety.

BACKGROUND

The present disclosure relates to controlling electronic devices and, more particularly, to automatically controlling designated electronic devices based on a footstep pattern of a user.

In general, one person repeatedly uses a certain set of electronic devices with the same pattern in a daily basis. For example, when the person enters into home from work, the person turns on a light of a living room, turns on a light of a first bedroom, preheats an oven, and turns on an audio system. Such a pattern of controlling may be repeated every day. Accordingly, there is a demand for identifying a registered member with minimum interaction of a user and automatically controlling a set of electronic devices associated with the identified member based on a predetermined control preference.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, electronic devices in a target control area may be automatically controlled based on a footstep pattern of a registered member.

In accordance with another aspect of the present embodiment, a registered member may be identified based on a footstep pattern and a weight of a foot, sensed by a predetermined sensor, and designated electronic devices may be automatically controlled based on control information associated with the identified member.

In accordance with still another aspect of the present embodiment, an intruder may be detected based on footstep information collected by sensing a footstep pattern and a weight of a person entering into or exiting from a target control area.

In accordance with further still another aspect of the present invention, electronic devices in a predetermined public place may be automatically controlled based on footstep information of public, which is collected by sensing footsteps of public passing by the predetermined public place.

In accordance with at least one embodiment, a method may be provided for controlling electronic devices in a target control area based on a footstep pattern of a member. The method may include identifying a person detected by a sensor based on footstep information received from the sensor, obtaining control information associated with the identified registered member, and controlling target devices in the target control area based on the obtained control information.

The identifying may include receiving the footstep information from the sensor, determining a footstep pattern made by detected footsteps and a weight of a detected person based on the received footstep information, and comparing the determined footstep pattern and the weight with footstep password patterns and weights of registered members included in registration information of the registered members.

The identifying may include identifying the detected person as a first registered member when a footstep pattern and a weight obtained from the footstep information are matched with a footstep password pattern and a weight of the first registered member based on registration information of the first registered member.

The footstep information may be generated by the sensor as a result of monitoring a predetermined area of the target control area and detecting footsteps of a person entering into or exiting from the target control area.

The method may further comprise receiving a registration request with control information and member information from a requester and registering the requester as a registered member and storing the control information and the member information as registration information of the registered member. The registering information may include information on a footstep password pattern of the requester, a weight of the requester, and a priority of the requester, as member information, and target devices to control in the target control area and control parameters of each target device as control information.

The obtaining control information may include selecting electronic devices to control in the target control area based on information on target devices in the obtained control information of the identified registered member, obtaining control parameters of each one of the selected electronic devices from the obtained control information of the identified registered member, and generating control signals based on the obtained control parameters and transmitting the generated control signals to the selected electronic devices.

The obtaining may include determining whether the identified member enters into the target control area or exits from the target control area based on the footstep information, collecting information on the target control area, determining whether other member in the target control area based on the collected information, obtaining control information of the other member in the target control area when the other member is in the target control area, and determining whether control conflict occurs between the identified member and the other member in the target control area based on the control information of the identified member and the other member. The obtaining may further include comparing target control devices of the identified member with target control devices of the other member in the target control area based on the obtained control information and determining that the control conflict occurs between the identified member and the other member in the target control area when at least one target control device is identical.

When the control conflict occurs, the obtaining may further include obtaining priorities of the identified member and the other member in the target control area from registration information of the identified member and the other member, selecting one having a priority higher than the other between the identified member and the other member by comparing the obtained priorities, and controlling electronic devices in the target control area based on control information associate with the selected one.

The method may include detecting an intrusion when no footstep password pattern and weight of registered members is matched with a footstep pattern and a weight obtained from the received footstep information. The method may further include contacting a predetermined person to inform the detected intrusion and controlling predetermined electronic devices in the target control area for warning the intrusion.

The method may further include obtaining an image of an intruder from associated devices in the target control area, transmitting the obtained image to a representative registered member, receiving a response message from the representative registered member, and determining whether a security procedure is performed based on information in the response message.

In accordance with at least one embodiment, a method may be provided for controlling electronic devices in a target control area based on footstep patterns of people passing by. The method may include collecting footstep information from a sensor installed at a monitoring area of the target control area, determining whether a predetermined trigger event is generated based on the collected footstep information, and controlling designated electronic devices in the target control area based on control information associated with the generated trigger event.

BRIEF DESCRIPTION OF THE DRAWINGS

The above and/or other aspects of the present invention will become apparent and more readily appreciated from the following description of embodiments, taken in conjunction with the accompanying drawings, of which.

DESCRIPTION OF EMBODIMENTS

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment, a registered member may be identified based on a footstep pattern, which is detected based on footsteps made by a user and sensed by a sensor, and a certain set of electronic devices in a target control area may be automatically controlled based on control information associated with the identified member. Hereinafter, an overall operation of automatically controlling electronic devices based on a footstep pattern of a registered member will be described with reference to FIG. 1.

Figure 1:
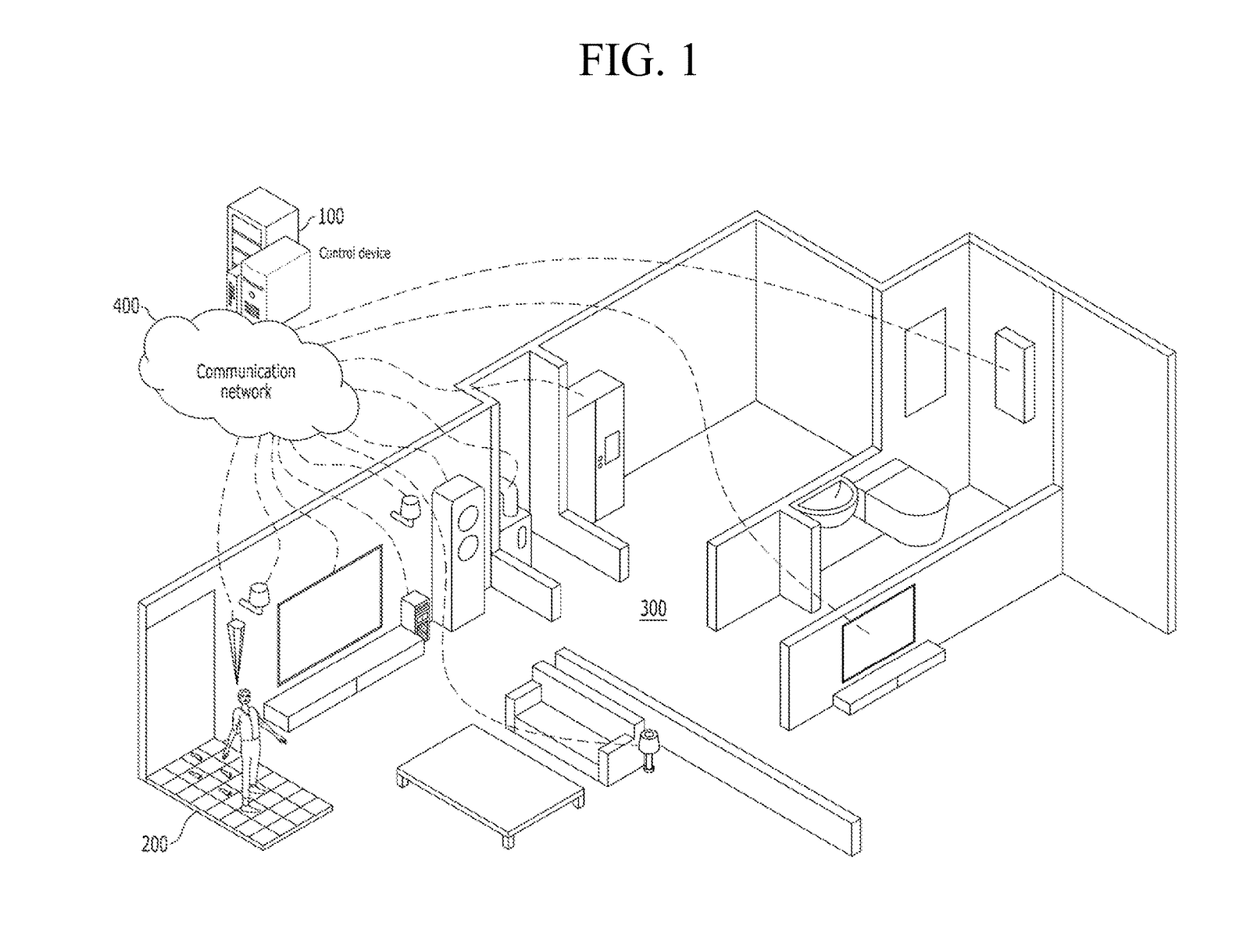
FIG. 1 illustrates a system of controlling electronic devices in a target control area based on a footstep pattern of a user in accordance with at least one embodiment.

FIG. 1 illustrates a system of controlling electronic devices in a target control area based on a footstep pattern of a user in accordance with at least one embodiment. For convenience and ease of understanding, home is illustrated as a target control area in FIG. 1, but the present invention is not limited thereto. The target control area for the system may be any places with a set of electronic devices installed, for example, an office, a hospital, and a public place.

Referring to FIG. 1, a system may collect information on footsteps made by a person who enters into or exits from target control area 300 (e.g. home or office), determine a footstep pattern based on the collected footstep information, and control associated electronic devices based on control information associated with the determined footstep pattern in accordance with at least one embodiment. Such a system may include control device 100, sensor 200, and various types of electronic devices (e.g., home appliances) in target control area 300, which may be coupled through communication network 400.

Communication network 400 may couple control device 100 with sensor 200 and other electronic devices in target control area 300. Communication network 400 may a communication cable, a communication line, or a wire connecting control device 100 with sensor 200 and other electronic devices in target control area 300. Furthermore, communication network 400 may be a typical communication network such as a wired or wireless communication network, such as Internet, WiFi, Bluetooth, and so forth.

The electronic devices in target control area 300 may be any devices capable of communication with control device 100 and capable of controlling constituent elements based on instructions (e.g., signals) from control device 100. For example, electronic devices 300 may be home appliances having an associated interface (human-machine and/or machine-to-machine). That is, electronic devices in the target control area 300 may include a refrigerator, a television set, a boiler for heating, an air-control system, a light, a water system, and likes, as shown in FIG. 1.

Sensor 200 may detect footsteps and a weight of a person in accordance with at least one embodiment. For example, sensor 200 may detect a size of a foot, a shape, a coordinate of a detected position, a moving direction, a moving speed, and so forth. Based on the detected information, sensor 200 generates the footstep information. The footstep information may include information on a right foot, a left foot, a footstep coordinate value (e.g., position value), a footstep sequence, a weight of a person associated with a detected foot, a weight distribution of a foot, and so forth. Sensor 200 may provide the footstep information to control device 100 through communication network 400, regularly or upon generation of a predetermined event, such as a request from control device 100.

Control device 100 may be a computing device coupled to sensor 200 and electronic devices in target control area 300, for receiving footstep information from sensor 200 and controlling electronic devices in target control area 300 based on the received footstep information. Such control device 100 may be a computer installed in target control area 300 and coupled to communication network 400, but the present invention is not limited thereto. Control device 100 may be a gateway device for a home automation system of target control area 300 or a circuit board implemented with the gateway device. Furthermore, control device 100 may be a service server installed at a remote location and coupled to target control area 300 through a typical communication network.

Control device 100 may be coupled to other automation systems (e.g., door entry system, access control system, security camera system, video monitoring system, power system, gas system) and interacted with the other automation systems, but the present invention is not limited thereto. Control device 100 may control the other automation system.

Control device 100 may interact with users in accordance with at least one embodiment. For example, control device 100 may communicate directly with user equipment (e.g., a smart phone, a laptop computer, a pad-like device) of a user for receiving information from the user and transmitting a response and a request to the user. Control device 100 may be coupled to a designated website posted on the Internet, provide related information through the designated website, and receive information from the user through the designated website. Control device 100 may provide an application (e.g., App) to user through a typical communication network. That is, a user may download a designated application from control device 100 and install the downloaded application in a predetermined portable or mobile device, such as a smart phone, a laptop, and a pad-like device.

Furthermore, control device 100 may be implemented as a portable device or a mobile device, which is capable of communicating, processing, and storing. For example, control device 100 may be implemented as a smart phone and coupled to sensor 200 and electronic devices in target control area 300 through the typical communication network.

Control device 100 may enable a user to register as a member by receiving control information from the user. Such registration may be performed through direct communication, through the posted website, and through the application installed in a portable and mobile device of the user. Control device 100 may receive footstep information from sensor 200, determine a footstep pattern and a weight of a person who made footsteps, identify a registered member based on the determined footstep pattern and weight, and control associated electronic devices in target control area 300 based on control information associated with the identified member.

As described, control device 100 may perform various operations for automatically controlling electronic devices in a target control area based on footstep patterns of a registered member in accordance with at least one embodiment. Hereinafter, control device 100 and operation thereof will be described in more detail with reference to FIG. 2, FIG. 3, and FIG. 4.

Figure 2:
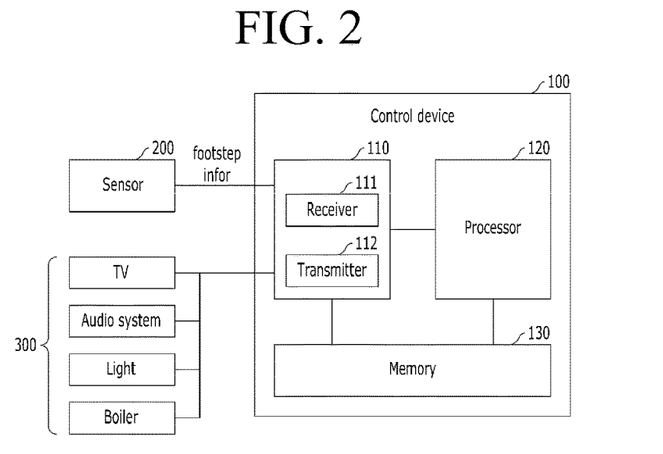
FIG. 2 illustrates a control device in accordance with at least one embodiment.

FIG. 2 illustrates a control device in accordance with at least one embodiment.

Referring to FIG. 2, control device 100 may include communication circuit 110, processor 120, and memory 130. Communication circuit 110 may further include receiver 111 and transmitter 112. Communication circuit 110 may receive information, data, and/or signals from and transmit information, data, and/or signal to other entities including sensor 200 and electronic devices in target control area 300. For example, receiver 111 may receive footstep information from sensor 200 and information on a current operation status from the electronic devices in target control area 300. Transmitter 112 may transmit control signals to the electronic devices in target control area 300 to control the electronic devices.

Memory 130 may store various information, for example, an operating system for controlling constituent elements, a designated application for enabling a user to register and control predetermined electronic devices in target control area 300, registration information collected from each member, operation status information collected from electronic devices in target control area 300, and footstep information collected from sensor 200.

Processor 120 may control associated constituent elements and other entities coupled through communication network 400. Particularly, processor 120 may perform operations for automatically controlling electronic devices in target control area 300 based on control information associated with a member identified by a footstep pattern thereof.

For example, processor 120 may perform operations for identifying a person entering into or exiting from target control area 300 based on footstep information obtained from sensor 200. In particular, processor 120 may receive footstep information including a footstep pattern and a weight of a detected person from sensor 200. Processor 120 may determine the step pattern and the weight of the detected person based on the obtained footstep information and identify a registered member associated with the determined footstep pattern and the weight through comparison of the determined footstep pattern and the associated weight with registration information stored in associated database. The registration information may include information collected from a user during registration. For example, the registration information may include a footstep password pattern, a weight, a foot size, target devices to control, and control parameters of each target device, and so forth.

When a detected person is identified as a registered member, processor 120 may perform operation for determining whether the identified member is entering into or exiting from the target control area. In case of entering, processor 120 may perform operation for determining whether the identified member is the first person entering the target control area. In case of exiting, processor 120 may perform operation for determining whether the identified member is the last person exiting the target control area. Depending on the determination result, processor 120 may perform operation for collecting operation status information from predetermined electronic devices in the target control area.

Furthermore, when a detected person is an unregistered person, processor 120 may perform a predetermined security procedure. For example, when processor 120 fails to identify the detected person based on the obtained footstep information, processor 120 may determine the detected person as an intruder and initiates a predetermined security procedure. For example, processor 120 may inform a representative registered member of such an illegal entry. In particular, processor 120 may obtain an image of a detected person through other electronic devices, such as a security camera, installed in the target control area and transmit the obtained image to a smart phone of the representative registered member. Based on the image, the representative registered member might confirm whether the detected person is an intruder or not and transmit a response message to control device 100.

Processor 120 may perform operation for obtaining control information associated with the identified member from memory 130. For example, processor 120 may fetch the control information associated with the identified member. Such control information may include information on at least one target device to control and control parameters of each target device. Furthermore, such control information may include control parameter information different according to operation status of each electronic device and confliction of a detected person and other persons in target control area 300.

Processor 120 may perform operations for controlling target electronic devices associated with the identified member based on the control information. That is, processor 120 may generate control signals based on the control information and transmit the generated control signals to the target electronic devices.

Hereinafter, operation of control device 200 will be described in more detail with reference to FIG. 3 and FIG. 4. For convenience and ease of understanding, home is illustrated in FIG. 3 and FIG. 4 as a target control area, but the present invention is not limited thereto.

Figure 3:
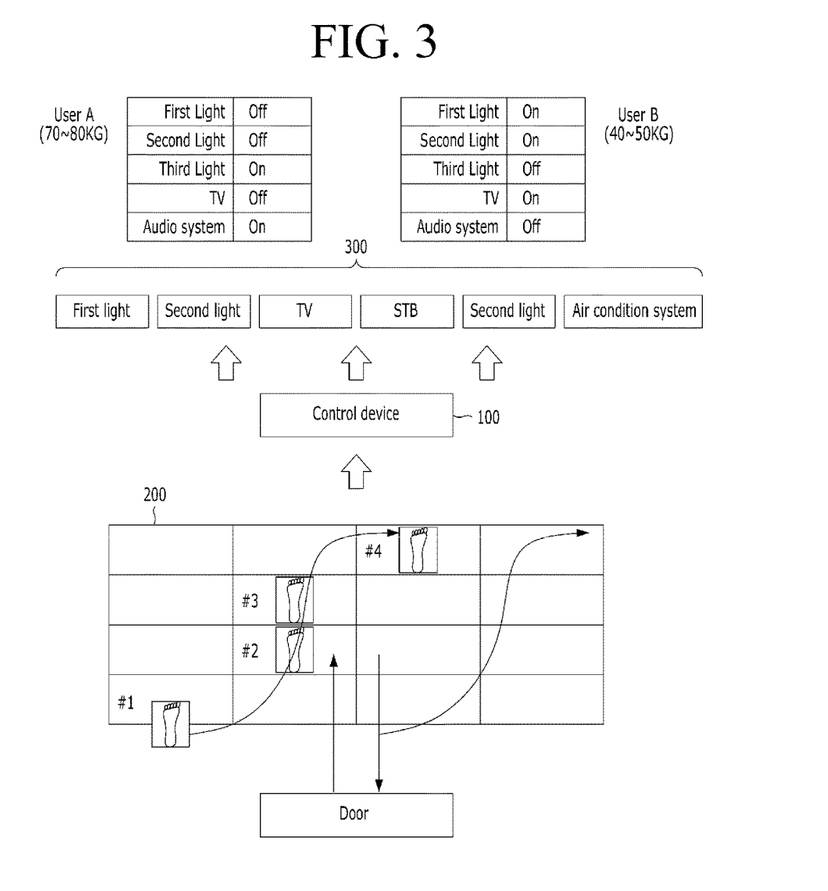
FIG. 3 illustrates a sensor and a control device installed at home for detecting footsteps of a person and controlling electronic devices according to the detected footsteps in accordance with at least one embodiment.
Figure 4:
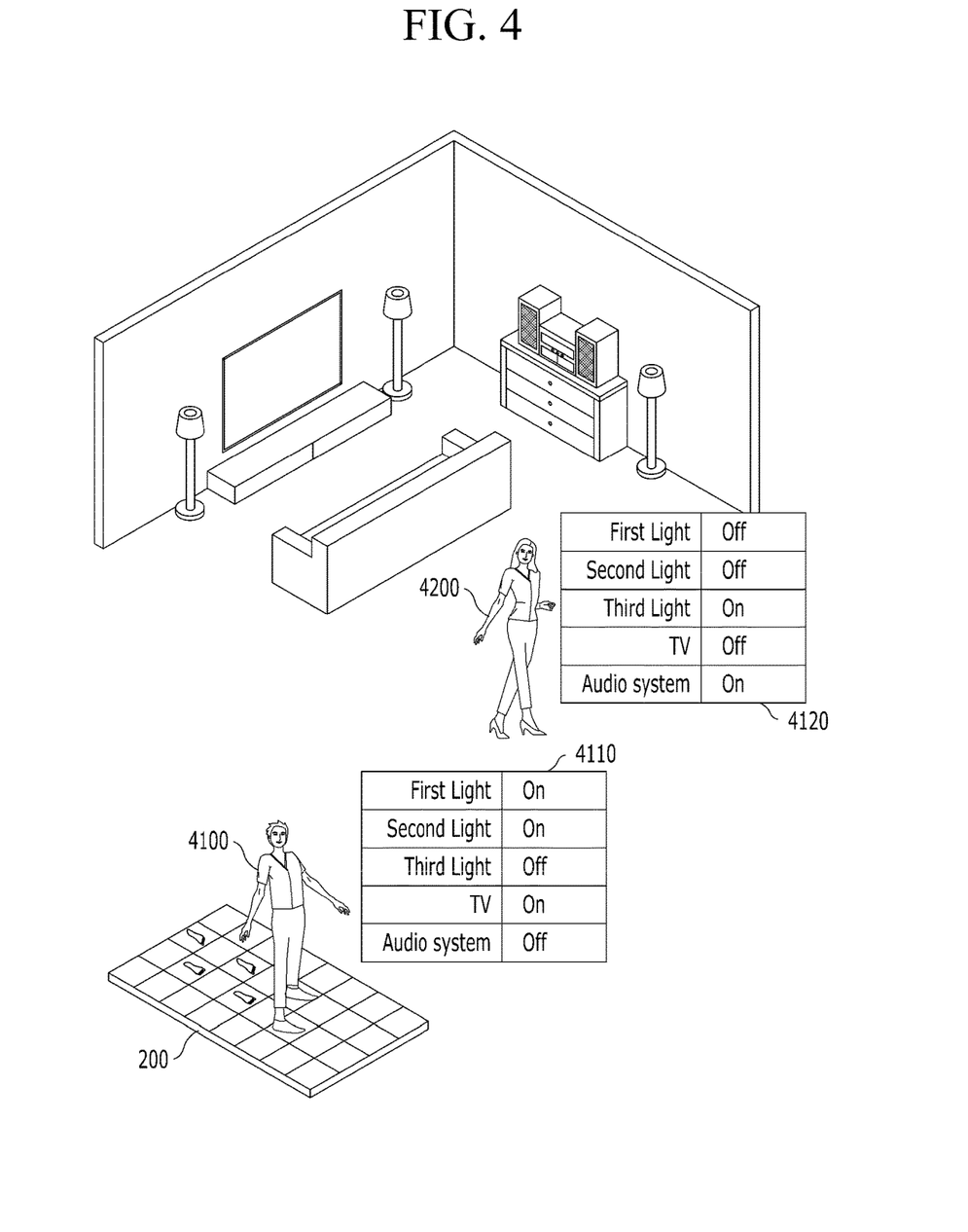
FIG. 4 illustrates controlling confliction of controlling electronic devices in a target control area in accordance with at least on embodiment.

FIG. 3 illustrates a sensor and a control device installed at home for detecting footsteps of a person and controlling electronic devices according to the detected footsteps in accordance with at least one embodiment.

Referring to FIG. 3, sensor 200 may be installed under a floor of a foyer area of home and sense footsteps and a weight of a person entering into or exiting out the home, a target control area. Each family member registers at control device 100 for controlling home appliances (e.g., electronic devices) according to preference of respective family member. During the registration, each family member provides control device 100 with information on a footstep password pattern, a size of a foot, a weight, target devices to control, control parameters of each target device, a priority to control the target devices, and so forth. Such entered information may be stored and managed as registration information in memory 130 of control device 100.

In particular, during the registration procedure, a first user A may enter a footstep sequence of step #1 to step #4 as a footstep password pattern, a weight as 70 to 80 Kg, target control devices as a third light and an audio system, and control parameters as turning-on, as shown in FIG. 3. Such entered information may be stored in memory 130 and managed by processor 120 as registration information of the first user A.

Sensor 200 monitors a foyer area, detects footsteps of a person entering into or exiting from home, and collects footstep information. The footstep information may include footstep coordinates, a shape of a footstep, a size of a foot, a weight distribution of a footstep, a weight of a person, a direction of movement of a person, a speed of movement of a person, and so forth. Sensor 200 transmits such collected footstep information to control device 100.

Control device 100 analyzes the footstep information from sensor 200 and determines a footstep pattern, a size of a foot, and a weight of a detected person based on the analysis result. Control device 100 may identify a family member based on the determined footstep pattern, size, and weight by comparing the determined footstep pattern, the size and the weight with registration information of each family member.

When the detected person is the user A because the determined footstep pattern is identical to the footstep password pattern of the user A, control device 100 obtains control information associated with the first user A. Control device 100 determines target electronic devices to control based on the obtained control information associated with the first user A, such as the third light and the audio system. Then, control device 100 collects information on the target control area (e.g., home). That is, control device 100 determines whether any registered family member in home. Furthermore, control device 100 collects information on current statuses of the determined target devices to control, associated with the first user A.

If no one is in home, control device 100 turns on the third light and the audio system based on the control information associated with the first user A. However, when a second user B is already in home and some of the target electronic devices is controlled based on control information associated with the second user B, confliction may occur for controlling the target control devices associated with the first user A. Hereinafter, operation for controlling confliction of controlling electronic devices will be described with reference to FIG. 4.

FIG. 4 illustrates controlling confliction of controlling electronic devices in a target control area in accordance with at least on embodiment.

Referring to FIG. 4, when sensor 200 detects first family member 4100 entering into home when second family member 4200 already in home, control device 100 determines whether confliction occurs between first family member 4100 and second family member 4200 in controlling electronic devices. For example, when two or more registered members want to control at least one same electronic device differently, the confliction occurs for controlling the same electronic device. In addition, when two or more registered members want to control at least one electric device that could disturb the others, the confliction occurs.

Control device 100 determines whether any confliction to control devices occurs based on the current status information and the target control area information. In particular, control device 100 obtains control information 4110 associated with first family member 4100 and target control area information of the home. Since second family member 4200 is in the home, control device 100 obtains control information 4120 associated with second family member 4200 and current states of the third light and the audio system, which are target control devices of second family member 4200. Since first family member 4100 and second family member 4200 designate the same target electric devices, the first to third lights, the TV, and the Audio system, to control, control device 200 determines that confliction occurs between first and second family members 4100 and 4200. For example, first family member wants automatically turn on the TV and the third light upon entrance of the home and second family member wants automatically turn off the TV and turn on the audio system upon entrance of home.

When the confliction occurs, control device 100 determines a priority of each member based on associated registration information and compares the priorities of first and second family members 4100 and 4200. When first family member 4100 has a priority higher than that of second family member 4200 and electric devices are currently controlled based on control information of second family member 4200, control device 100 selects all electric devices from target control devices included in the control information of first family member 4100. That is, control device 100 selects the third light and the TV. Based on the selection, control device 100 generates control signals and transmits the control signals to the selected electronic devices, the third light and the TV. In response to the control signals, the third light is turned on and the TV is turned on.

When first family member 4100 has a priority lower than that of second family member 4200 and electric devices are currently controlled based on control information of second family member 4200, control device 100 selects electric devices not controlled by second family member 4200 from target control devices included in the control information of first family member 4100. Based on the selection, control device 100 generates control signals and transmits the control signals to the selected electronic devices.

Figure 5:
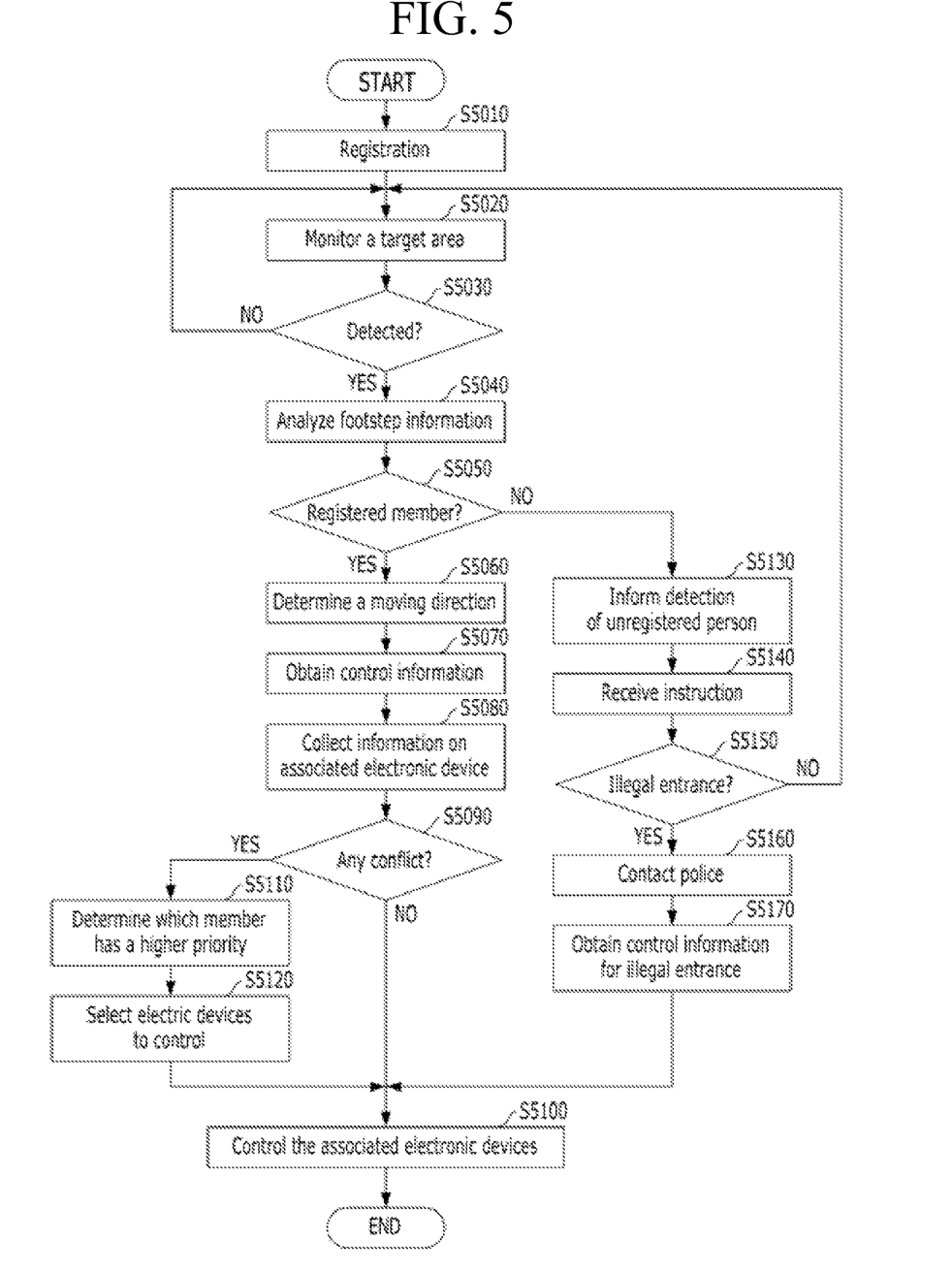
FIG. 5 illustrates a method of controlling electronic devices in a target control area according to a footstep pattern of each user in accordance with at least one embodiment of the present invention.

FIG. 5 illustrates a method of controlling electronic devices in a target control area according to a footstep pattern of each user in accordance with at least one embodiment of the present invention. For convenience and ease of understanding, controlling home appliances in a home network will be described as one of embodiments, but the present invention is not limited thereto.

Referring to FIG. 5, a registration procedure may be performed in response to a user request at step S5010. For example, each family member registers at control device 100 for controlling home appliances and electronic devices, coupled through a home network, according to preference of respective family member. During the registration, each family member provides control device 100 with information on a footstep password pattern, a size of a foot, a weight, target devices to control, control parameters of each target device, a priority to control the target devices, and so forth. Such entered information may be stored and managed as registration information.

In particular, one of family members initiates a registration procedure by entering a designated input to control device 100. Such initiation may be performed by selecting a designated icon displayed in a graphic user interface produced by and displayed on a designated monitor associated with control device 100. Furthermore, such a graphic user interface enables each family member to enter the information on a footstep pattern, a size of a foot, a weight, target devices to control, control parameters of each target device, and so forth.

Alternatively, such initiation may be performed through user equipment (e.g., a smart phone) of each family member. For example, a user may initiate a designated application (e.g., App), downloaded from control device 100 and installed in the user equipment, for the registration. As result of the initiation, a graphic user interface may be produced and displayed on a display of the user equipment and the displayed graphic user interface enables the user to perform registration and to enter information on a footstep pattern, a size of a foot, a weight, target devices to control, control parameters of each target device, and so forth. Such entered information may be stored and managed as registration information.

At step S5020, a target area may be monitored for detecting footsteps. For example, sensor 200 monitors a foyer area to detect a person or footsteps of a person, who enters into or exits from a target control area (e.g., inside home). That is, footstep sensor 220 may be installed under a floor of a foyer area and detect a person or footsteps of a person, who passes through the foyer area for entering into home or exiting from home.

At step S5030, determination may be made so as whether any person or any footsteps are detected. For example, sensor 200 monitors the foyer area and determines whether any footsteps are detected upon generation of a predetermined event. When a person or a footstep is not detected (No—S5030), the target area (e.g., foyer area) may be continuously monitored at step S5020.

When footsteps are detected (Yes—S5030), footstep information may be collected and analyzed. For example, sensor 200 detects footsteps of a person entering into or exiting from home and collects footstep information. The footstep information may include footstep coordinates, a size of a foot, a weight of a person, a direction of movement of a person, a speed of movement of a person, and so forth. Sensor 200 may transmit such collected footstep information to control device 100 through communication network 400.

At step S5050, determination may be made so as whether a detected person is a registered member based on the collected footstep information. For example, control device 100 analyzes the footstep information from sensor 200 and determines a footstep pattern, a size of a foot, and a weight of a detected person based on the analysis result. Control device 100 may identify a family member based on the determined footstep pattern, size, and weight by comparing the determined footstep pattern, the size and the weight with registration information stored in an associated database.

When the detected person is one of registered members (Yes—S5050), a direction of movement may be determined at step S5060. For example, when the detected person is one of the family members registered at control device 100, control device 100 determines a moving direction of the identified member based on the collected footstep information at step S5060.

At step S5070, associated control information may be obtained. For example, control device 100 obtains control information associated with the identified member from the database. Such control information may include information on target devices to control and control parameters of each one of the target devices.

At step S5080, information on a target control area and the target devices to control may be collected. For example, control device 100 may determine target electronic devices (e.g., home appliances) to control based on the obtained control information associated with the identified member. That is, control device 100 selects target devices to control from electronic devices in the target control area based on the control information of the identified member.

Control device 100 may collect information on the target control area (e.g., home). Based on the collected target control area information, control device 100 may determine when any registered family member stays inside home. Such target control area information may be obtained by analyzing footstep information of all persons entering into and exiting from the target control area (e.g., home), which are collected by sensor 200 and stored in control device 100. Alternatively, such target control area information may be obtained from other smart home system (e.g., entry monitoring system or security system) coupled to control device 100 through communication network 400.

Control device 100 may collect information on current statuses of the determined target devices. That is, such status information may include information on an operation state (e.g., on or off), a registered member who controls a device when the device is on, and so forth. Such information may be collected through communication between control device 100 and respective electronic device.

At step S5090, determination may be made so as whether confliction occurs. For example, when two or more registered members want to control at least one same electronic device differently, such confliction might occur. In addition, when two or more registered members want to control at least one electric device that could disturb the others, the confliction might occur. Such confliction information may be determined by a system design and stored in control device 100. Furthermore, the confliction information may be modified by or newly determined and updated by at least one family member during the registration or upon generation of a predetermined event.

Control device 100 determines whether any confliction to control devices occurs based on the current status information and the target control area information. In particular, control device 100 may perform a confliction determination operation as follows, but the present invention is not limited thereto. When control device 100 identifies a first family member entering home, control device 100 obtains control information associated with the first family member and target control area information of a target control area (e.g., home) associated with the first family member. Control device 100 determines whether any other family member is in the target control area (e.g., home). If no one is in the target control area, control device 100 determines no confliction occurs. If a second family member is in the target control area, control device 100 obtains control information associated with the second family member and current states of electronic devices currently controlled based on the control information associated with the second family member. When the first family member and the second family member designate at least one of same target electric devices to control, control device 200 determines that confliction occurs.

For example, a first member sets registration information to automatically turn on a TV upon entrance of home and a second member sets registration information to automatically turn off the TV and turn on an audio system upon entrance of home. The confliction might occur if the first member enters home while the second member is staying in home and listens to an audio system. In this case, one of the first member and the second member must yield one's right to control an associated device (e.g., TV) to the other.

When no confliction occurs (No—S5090), electronic devices may be control based on control information associated with the identified member at step S5100. For example, control device 100 generates control signals based on control parameters included in the control information associated with the identified member and transmits the generated control signals to target electronic devices included in the control information associated with the identified member. In response to the control signals, the target electronic devices associated with the identified member perform operations.

When the confliction occurs (Yes—S5090), determination may be made so as which member has a higher priority at step S5110. For example, control device 100 determines a priority of each member based on associated registration information. That is, control device 100 compares the priorities of the first and second family members.

At step S5120, electric devices to control may be selected based on the priority of members. For example, when the first family member has a priority higher than that of the second family member and electric devices are currently controlled based on control information of the second family member, control device 100 selects all electric devices from target control devices included in the control information of the first family member. When the first family member has a priority lower than that of the second family member and electric devices are currently controlled based on control information of the second family member, control device 100 selects electric devices not controlled by the second family member from target control devices included in the control information of the first family member. Based on the selection, control device 100 generates control signals.

At step S5100, the control signals may be transmitted to the selected electronic devices and the selected devices may perform operations based on the control signals. For example, control device 100 transmits the generated control signals to the selected electronic devices through communication network 400. In response to the control signals, respective electronic device performs operations in the associated member's preferred way.

Referring back to step S5050, when the detected person is not a registered member (No—S5050), a representative registered member may be informed of that a unregistered person is detected at step S5130. For example, control device 100 may obtain information on the detected person, such as an image from a camera of a security system coupled to control device 100, and transmit the obtained information to one of registered family members, such as a representative registered member. Such a representative registered member may be set by at least one of registered family members.

Particularly, an image of the detected person may be transmitted to user equipment of one of the registered family members and inquiry whether the detected person is one of family members or an intruder. In response to such inquiry, the registered family member transmits a response message to control device 100 through the user equipment. The response message may include information on whether the detected person is an intruder and information on control designated devices.

At step S5140, such a response message may be received and analyzed. For example, control device 100 receives the response message from the user equipment of the representative registered family member and analyzes the received response message. At step S5150, determination may be made so as whether the detected person is an intruder. For example, control device 100 determines whether the detected person is an intruder based on the analysis result.

When the detected person is not an intruder (No—S5150), a target area may be continuously monitored to detect footsteps of other persons at step S5020. When the detected person is an intruder (Yes—S5150), a predetermined person may be contacted to inform the illegal entry or the intruder at step S5160. For example, control device 100 may automatically contact a police station and inform them of the illegal entry.

At step S5170, control information for the illegal entry or the intruder may be obtained. For example, control device 100 may obtain the control information for the illegal entry or the intruder from the response message and/or the database. Such control information for the illegal entry or the intruder may include information on controlling selected devices to inform members in home of the intruder or the illegal entry or controlling selected devices to warn the intruder to leave.

At step S5100, the control signals may be transmitted to the selected electronic devices and the selected devices may perform operations based on the control signals. For example, control device 100 generates control signals based on the obtained control information for the illegal entry or the introducer, and transmits the generated control signals to the selected electronic devices through communication network 400. In response to the control signals, respective electronic device performs operations.

As described, electronic devices (e.g., home appliances) in home may be controlled based on a footstep pattern of each family member in accordance with at least one embodiment. Such a method may be applied to a public place for controlling designated devices according to footstep patterns of people passing by. Such operation will be described with reference to FIG. 6 and FIG. 7.

Figure 6:
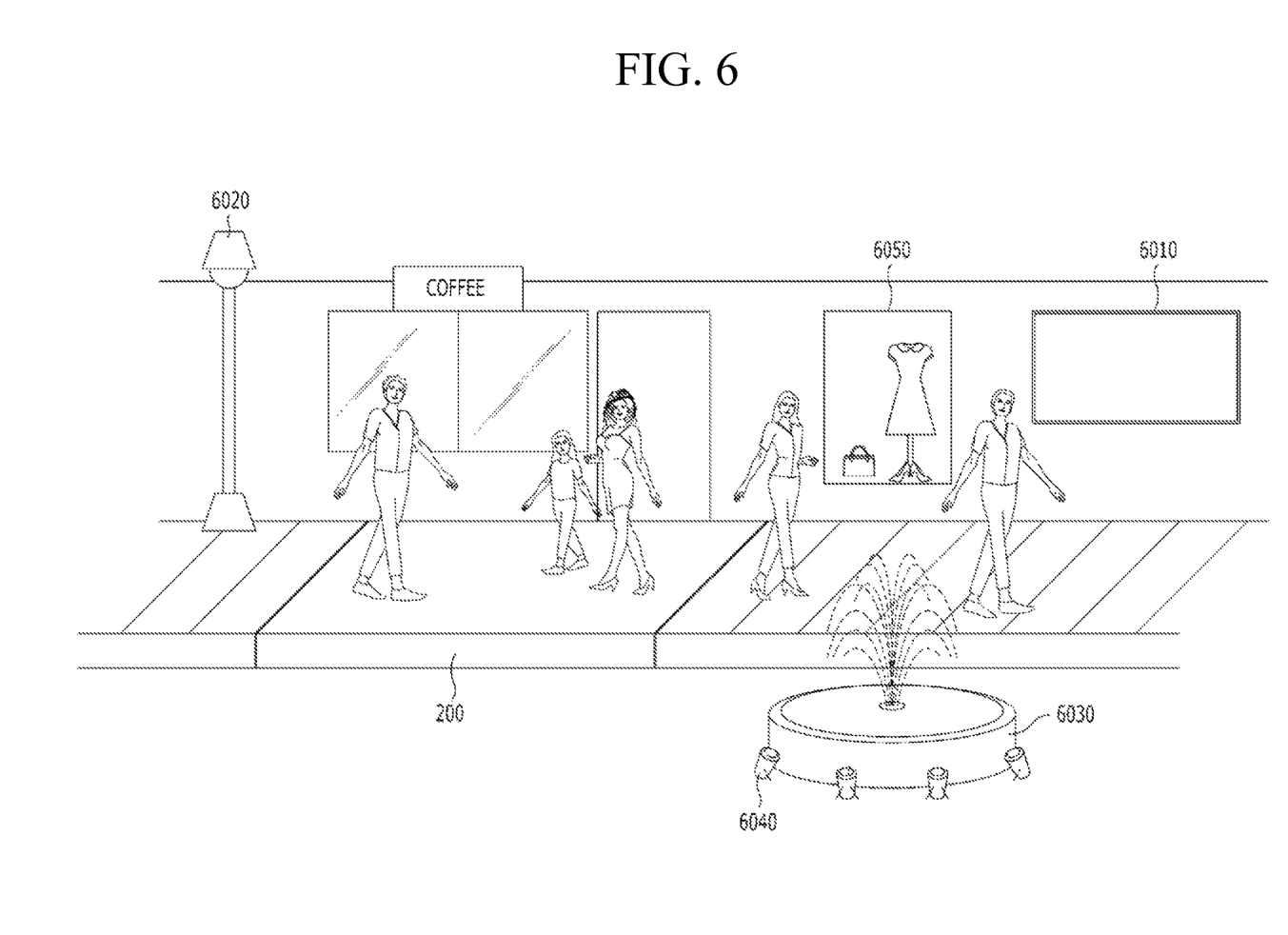
FIG. 6 illustrates controlling designated electronic devices in a public place based on footstep patterns of public passing by in accordance with at least one embodiment.

FIG. 6 illustrates controlling designated electronic devices in a public place based on footstep patterns of public passing by in accordance with at least one embodiment.

Referring to FIG. 6, a public place might have many electronic devices such as streetlamp 6020, show window 6050, advertising screen 6010, fountain 6030, and lights 6040, for people passing by. In accordance with at least one embodiment, such electronic devices in the public place may be controlled based on analysis of footstep patterns of people passing by.

For example, a manager of a department store, a shop owner, or a building and property custodian may register at control device 100 for automatically controlling designated electronic devices in a target control area around a department store, a shop, or a building. During the registration, control information may be provided to control device 100. In this case, control device 100 may be a service server coupled to the designated electronic devices (e.g., 6020, 6050, 6010, 6030, and 6030) through communication network 400.

The control information may include information on a trigger event, target devices to control, control parameters of each target device, and so forth. The trigger event information denotes an event that will initiate controlling target devices according to the control parameters. The trigger event information may be more than 100 people passing by in 10 minutes, more than 30 female passing by in 10 minutes, or less than 10 people passing by in 10 minutes. The target device information may be information on devices to control when the trigger event occurs and the control parameter information may be information on how to control a corresponding target device. For example, an operator of advertising screen 6010 registers at control device 100 with control information including "more than 100 female passing by in 10 minutes" as a first trigger event, "advertising screen 6010" as a first target device to control, and "playing an advertisement of cosmetic products" as a first control parameter. As another example, a building and property custodian of fountain 6030 registers at control device 100 with control information including "less than 10 people passing by in 10 minutes" as a second trigger event, "fountain 6030" and "lights 6040" as second target devices to control, and "turn-off a fountain and lights" as a second control parameter.

Footstep sensor 200 may be installed under a predetermined section of the target control area and collect footsteps of people passing by the target control area. Footstep sensor 200 may transmit the footstep information to control device 100 (e.g. service server) through a communication network. Control device 100 may analyze the collected footstep information and determine whether a predetermined trigger event is generated or not based on the analysis result.

Such footstep information may include information on a size of a foot (e.g., shoe), a shape of a foot (e.g., shoe), a weight, a direction of movement, a speed of movement, and so forth. Based on such information, control device 200 may determine whether a predetermined trigger event occurs.

Upon the generation of the trigger event, control device 100 obtains information on the target device information and the control parameter information associated with the generated trigger event and controls the target devices based on the associated control parameters. That is, control device 100 may generate control signals based on the control parameters and transmit the generated control signals to the target devices through the communication network.

For example, when control device 100 detects more than 100 females passing by in 10 minutes, control device 100 determines that the first trigger event occurs. Then, control device 100 obtains information on the first target device and the first control parameter as control information associated with the first trigger event based on the registration information of the operator of advertising screen 6010. Control device 100 generates control signals based on the first control parameters "playing an advertisement of cosmetic products" and transmits the generated control signals to advertising screen 6010 (e.g., the first target device). In response to the control signals, advertising screen 6010 displays the cosmetic product advertisement.

For example, when control device 100 detects less than 10 people passing by in 10 minutes, control device 100 determines that the second trigger event occurs. Then, control device 100 obtains information on the second target devices and the second control parameter as control information associated with the second trigger event based on the registration information of the building and property custodian of fountain 6030 and lights 6040. Control device 100 generates control signals based on the second control parameters "turning off a fountain and lights" and transmits the generated control signals to fountain 6030 and lights 6040 (e.g., the second target devices). In response to the control signals, fountain 6030 and lights 6040 are turned on. Such operation for controlling electronic devices in a public place based on footstep patterns of public passing by will be described with reference to FIG. 7.

Figure 7:
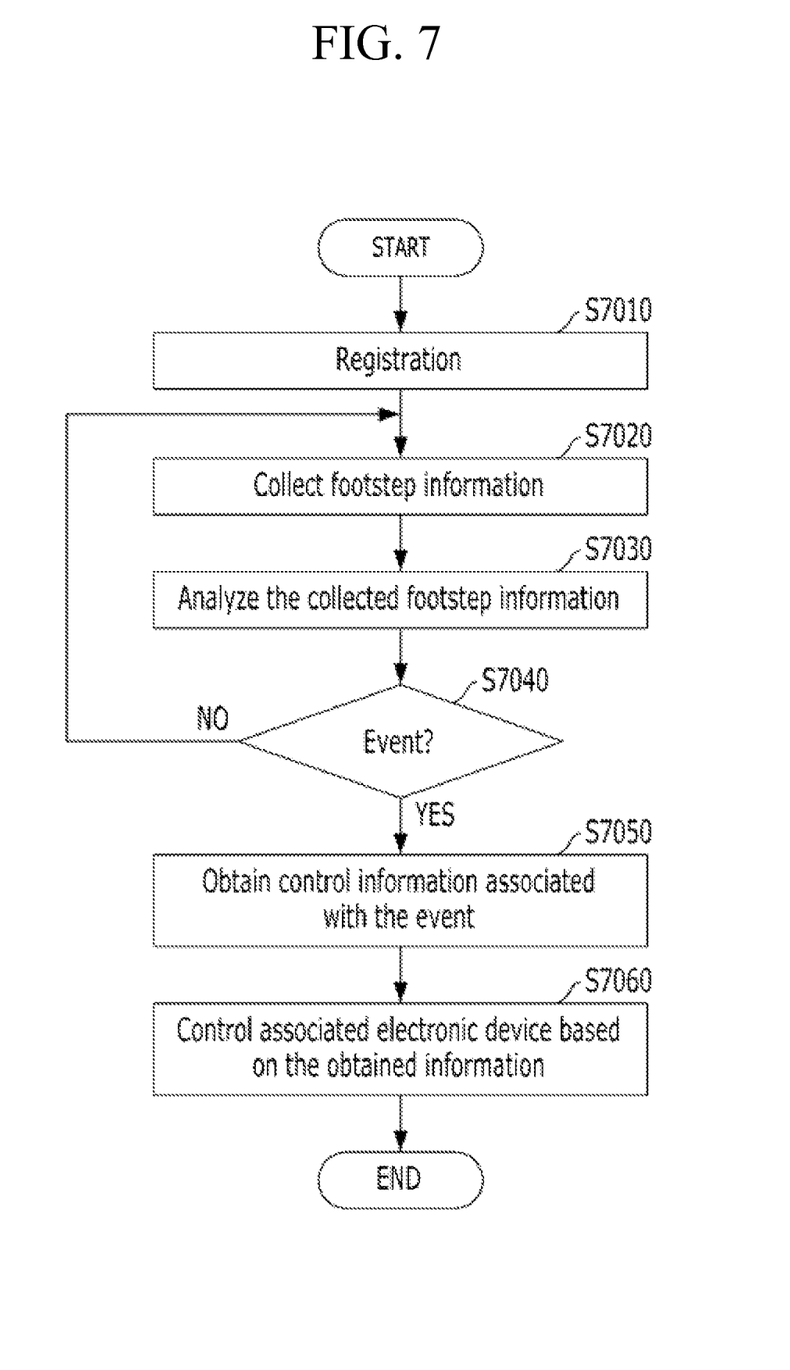
FIG. 7 illustrates a method of controlling electronic devices based on footstep patterns in accordance with at least one embodiment.

FIG. 7 illustrates a method of controlling electronic devices based on footstep patterns in accordance with at least one embodiment.

Referring to FIG. 7, a registration procedure may be performed. For example, a manager of a department store, a shop owner, or a building and property custodian may perform the register procedure for registering at control device 100 for automatically controlling designated electronic devices in a target control area around a department store, a shop, or a building. Such a registration procedure may be performed through a website posted in the Internet and managed by control device 100 or through an application downloaded from control device 100 and installed in user equipment of the manager, the shop owner, or the building and property custodian, but the present invention is not limited thereto.

During the registration procedure, control information may be provided to control device 100. The control information may include information on a trigger event, target devices to control, control parameters of each target device, and so forth. The trigger event information denotes an event that will initiate controlling target devices according to the control parameters. The target device information may be information on devices to control when the trigger event occurs and the control parameter information may be information on how to control a corresponding target device.

At step S7020, footstep information may be collected. For example, footstep sensor 200, installed under a predetermined section of a target control area, collects footsteps of people passing by the target control area. Footstep sensor 200 transmits the footstep information to control device 100.

At step S7030, the collected footstep information may be analyzed. For example, control device 100 may receive the collected footstep information and analyze the collected footstep information. The footstep information may include information on a size of a foot (e.g., shoe), a shape of a foot (e.g., shoe), a weight, a direction of movement, a speed of movement, and so forth.

At step S7040, determination may be made so as whether a predetermined trigger event is generated. For example, control device 100 determines whether a predetermined trigger event is generated or not based on the analysis result. That is, control device 100 determines, in a unit time, how many females, males, kids, or adults passing by based on the footstep information, such as a size of a foot, a shape of a shoe, a weight, a direction, and a speed, and footstep patterns. Based on the analysis result, control device 100 may determine whether more than 100 people pass by in 10 minutes, whether more than 30 female pass by in 10 minutes, or whether less than 10 people pass by in 10 minutes.

When such a trigger event is not generated based on the analysis result (No—S7040), footstep information may be continuously collected at step S7020 and the collected footstep information may be continuously analyzed at step S7030.

When one of registered trigger events occurs based on the analysis result (Yes—S7040), control information associated with the determined trigger event may be obtained at step S7050. For example, control device 100 obtains control information associated with the trigger event from the registration information stored in a database. That is, when control device 100 determines that the first trigger event is generated, control device 100 obtains the first target device information and the first control parameter information from the control information included in the registration information of the operator of advertising screen 6010.

The operator of advertising screen 600 registers at control device 100 with control information including "more than 100 female passing by in 10 minutes" as a first trigger event, "advertising screen 6010" as a first target device to control, and "playing an advertisement of cosmetic products" as a first control parameter. In this case, control device 100 obtains "advertising screen 6010" as the first target device to control, and "playing an advertisement of cosmetic products" as the first control parameter from the registration information.

At step S7060, the target devices may be controlled based on the associated control parameter. For example, control device 100 generates control signals based on the first control parameters "playing an advertisement of cosmetic products" and transmits the generated control signals to advertising screen 6010 (e.g., the first target device). In response to the control signals, advertising screen 6010 displays the cosmetic product advertisement.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling electronic devices in a target control area based on footstep information of a registered member, the method comprising:
   identifying a person detected by a sensor installed in a predetermined area, based on the footstep information received from the sensor;
   obtaining control information associated with the identified registered member; and
   controlling target devices in the target control area based on the obtained control information,
   wherein the footstep information includes information on a footstep password pattern made by a plurality of footsteps and a weight of the detected person, and
   wherein the footstep password pattern includes information on whether each of the footsteps is associated with a right foot or a left foot of the detected person based on a footstep shape detected by the sensor and a footstep sequence of at least one of the left foot and the right foot.

2. The method of claim 1, wherein the identifying comprises:
   receiving the footstep information from the sensor;
   determining the footstep password pattern made by detected footsteps and the weight of the detected person based on the received footstep information; and
   comparing the determined footstep password pattern and the weight with the footstep password pattern and weights of registered members included in registration information of the registered members.

3. The method of claim 1, wherein the identifying comprises:
   identifying the detected person as a first registered member when the footstep password pattern and the weight obtained from the footstep information are matched with a footstep password pattern and a weight of the first registered member based on registration information of the first registered member.

4. The method of claim 2, wherein the footstep information is generated by the sensor as a result of monitoring the predetermined area of the target control area and detecting footsteps of a person entering into or exiting from the target control area.

5. The method of claim 1, comprising:
   receiving a registration request with control information and member information from a requester; and
   registering the requester as a registered member and storing the control information and the member information as registration information of the registered member.

6. The method of claim 5, wherein the registering information includes information on the footstep password pattern of the requester, a weight of the requester, and a priority of the requester, as member information, and target devices to control in the target control area and control parameters of each target device as control information.

7. The method of claim 1, wherein the obtaining control information comprises:
   selecting electronic devices to control in the target control area based on information on target devices in the obtained control information of the identified registered member;
   obtaining control parameters of each one of the selected electronic devices from the obtained control information of the identified registered member; and
   generating control signals based on the obtained control parameters and transmitting the generated control signals to the selected electronic devices.

8. The method of claim 1, wherein the obtaining comprises:
   determining whether the identified member enters into the target control area or exits from the target control area based on the footstep information;
   collecting information on the target control area based on the determination result;
   determining whether other member is in the target control area based on the collected information;
   obtaining control information of the other member in the target control area when the other member is in the target control area; and
   determining whether control conflict occurs between the identified member and the other member in the target control area based on the control information of the identified member and the other member.

9. The method of claim 8, wherein the obtaining comprises:
   comparing target control devices of the identified member with target control devices of the other member in the target control area based on the obtained control information; and
   determining that the control conflict occurs between the identified member and the other member in the target control area when at least one target control device is identical.

10. The method of claim 8, wherein when the control conflict occurs, the obtaining comprises:
    obtaining priorities of the identified member and the other member in the target control area from registration information of the identified member and the other member;
    selecting one having a priority higher than the other between the identified member and the other member by comparing the obtained priorities; and
    controlling electronic devices in the target control area based on control information associate with the selected one.

11. The method of claim 1, comprising:
    detecting an intrusion when no footstep password pattern and weight of registered members is matched with the footstep password pattern and the weight obtained from the received footstep information.

12. The method of claim 11, comprising:
contacting a predetermined person to inform the detected intrusion; and
controlling predetermined electronic devices in the target control area for warning the intrusion.

13. The method of claim 11, comprising:
obtaining an image of an intruder from associated devices in the target control area;
transmitting the obtained image to a representative registered member;
receiving a response message from the representative registered member; and
determining whether a security procedure is performed based on information in the response message.

14. A method of controlling electronic devices in a target control area based on footstep password patterns, the method comprising:
collecting footstep information from a sensor installed at a monitoring area of the target control area;
determining whether a predetermined trigger event is generated based on the collected footstep information; and
controlling designated electronic devices in the target control area based on control information associated with the generated trigger event,
wherein the footstep information includes information on a footstep password pattern made by a plurality of footsteps and a weight of each person who makes the footsteps;
wherein the footstep password pattern includes information on whether each of the footsteps is associated with a right foot or a left foot of each person based on a footstep shape detected by the sensor and a footstep sequence of at least one of the left foot and the right foot.

15. The method of claim 14, wherein the collected footstep information is received from the sensor by monitoring the monitoring area in the target control area and detecting footsteps of people passing by the target control area.

16. The method of claim 14, wherein the determining comprises:
analyzing the collected footstep information; and
determining how many male, female, kids, and adults pass by the target control area in a unit time based on the analysis result.

17. The method of claim 14, wherein the collected footstep information further includes information on at least one of a size, the footstep shape, a weight distribution, a moving direction, and a moving speed.

18. The method of claim 14, wherein the determining comprises:
determining a first trigger event is generated when a predetermined number of people passes by the target control area in a predetermined unit time based on the analysis of the footstep information.

19. The method of claim 18, comprising:
obtaining control information associated with the first trigger event;
selecting target devices in the target control area based on the obtained control information; and
generating control signals based on the obtained control information and transmitting the control signals to the selected target devices.

20. The method of claim 14, comprising:
receiving a registration request with trigger event information and control information from a requester; and
registering the requester with the received trigger event information and the received control information as registration information of the requester,
wherein the trigger event information includes conditions to trigger controlling target devices in the target control area, and the control information includes the target devices to control and control parameters of each target device.

* * * * *